United States Patent
Vorderbruggen et al.

(10) Patent No.: US 9,944,558 B2
(45) Date of Patent: Apr. 17, 2018

(54) WELLBORE CEMENT COMPOSITIONS AND WELLBORE CEMENTING METHODS

(71) Applicant: BAKER HUGHES INCORPORATED, Houston, TX (US)

(72) Inventors: Mark A. Vorderbruggen, Spring, TX (US); Guido G. Narvaez, Houston, TX (US); Diana Cardona, Houston, TX (US); Dong Shen, The Woodlands, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 173 days.

(21) Appl. No.: 15/075,761

(22) Filed: Mar. 21, 2016

(65) Prior Publication Data

US 2016/0200959 A1 Jul. 14, 2016

Related U.S. Application Data

(62) Division of application No. 14/077,554, filed on Nov. 12, 2013, now Pat. No. 9,359,254.

(51) Int. Cl.
| | | |
|---|---|---|
| E21B 33/13 | (2006.01) | |
| C04B 20/10 | (2006.01) | |
| C04B 20/00 | (2006.01) | |
| E21B 33/14 | (2006.01) | |
| C04B 28/02 | (2006.01) | |
| C09K 8/467 | (2006.01) | |
| C04B 103/20 | (2006.01) | |

(52) U.S. Cl.
CPC ...... *C04B 20/1018* (2013.01); *C04B 20/0016* (2013.01); *C04B 20/1022* (2013.01); *C04B 20/1037* (2013.01); *C04B 28/02* (2013.01); *C09K 8/467* (2013.01); *E21B 33/13* (2013.01); *E21B 33/14* (2013.01); *C04B 2103/20* (2013.01)

(58) Field of Classification Search
CPC .................................. C04B 7/02; E21B 33/13
See application file for complete search history.

(56) References Cited

U.S. PATENT DOCUMENTS

| | | | |
|---|---|---|---|
| 2,674,321 A | | 4/1954 | Cutforth et al. |
| 3,692,842 A | * | 9/1972 | Massie .................... C07C 37/60 428/129 |
| 3,727,687 A | | 4/1973 | Clampitt et al. |
| 3,767,433 A | * | 10/1973 | Haldas .................... C04B 28/02 106/718 |
| 4,234,344 A | | 11/1980 | Tinsley et al. |
| 4,569,393 A | | 2/1986 | Bruning et al. |
| 4,579,668 A | | 4/1986 | Messenger |
| 4,657,593 A | | 4/1987 | Aignesberger et al. |
| 4,961,790 A | * | 10/1990 | Smith ...................... B28C 5/003 106/725 |
| 5,728,209 A | * | 3/1998 | Bury .................... C04B 40/0633 106/638 |
| 6,245,142 B1 | * | 6/2001 | Reddy ................. C04B 20/1018 106/724 |
| 6,648,962 B2 | * | 11/2003 | Berke ....................... C04B 7/52 106/696 |
| 6,689,208 B1 | | 2/2004 | Brothers |
| 7,063,738 B2 | | 1/2006 | Danican |
| 7,086,466 B2 | * | 8/2006 | Roddy .................... C04B 18/16 106/819 |
| 7,147,055 B2 | * | 12/2006 | Brothers ............... C04B 14/108 106/692 |
| 7,351,680 B2 | | 4/2008 | Hayes |
| 7,470,321 B2 | | 12/2008 | Chan |
| 7,575,055 B2 | | 8/2009 | Reddy et al. |
| 7,654,326 B1 | * | 2/2010 | Santra .................... C04B 28/32 106/684 |
| 7,866,394 B2 | | 1/2011 | Creel et al. |
| 3,236,879 A1 | | 8/2012 | Michaux |
| 2004/0211562 A1 | | 10/2004 | Brothers et al. |
| 2005/0155763 A1 | | 7/2005 | Reddy et al. |
| 2006/0075932 A1 | | 4/2006 | Lecolier et al. |
| 2006/0225622 A1 | | 10/2006 | Brothers |
| 2007/0137528 A1 | | 6/2007 | Le Roy-Delage et al. |
| 2008/0108524 A1 | | 5/2008 | Willberg et al. |
| 2009/0283017 A1 | | 11/2009 | Spangle et al. |

(Continued)

FOREIGN PATENT DOCUMENTS

| | | |
|---|---|---|
| GB | 984868 | 3/1965 |
| GB | 1324411 | 7/1973 |
| WO | WO2011027122 | 3/2011 |

OTHER PUBLICATIONS

CN 101935181 Xing et al. (Jan. 5, 2011) abstract only—see inside office action last page.*
BJ Sorb Family of Solid Chemicals, Product Overview, Long-Lasting Flow Assurance, Baker Hughes, 2011.
Concrete Slurry Solidification, Retrieved From Internet on Jul. 22, 2013; http://www.icsocompany.net/solificaton_powder.htm.
International Searching Authority, International Search Report and Written Opinion issued in International Application No. PCT/US2014/056809 dated Jan. 9, 2015.

(Continued)

Primary Examiner — Paul D Marcantoni
(74) Attorney, Agent, or Firm — Parsons Behle & Latimer

(57) ABSTRACT

A wellbore cement composition includes substantially unhydrated cement powder and additive powder for cement. The additive powder is formulated from ingredients including a liquid additive for cement and solid carrier particles. The liquid additive is absorbed by the solid carrier particles. A wellbore cementing method includes using a dry cement composition, adding water to the dry cement composition, forming a cement slurry, placing the slurry in a wellbore, and setting the placed slurry. The dry cement composition contains substantially unhydrated cement powder and retarder powder for cement. The retarder powder contains a retarder absorbed by solid carrier particles.

21 Claims, No Drawings

(56) References Cited

U.S. PATENT DOCUMENTS

2010/0071901 A1     3/2010   Luo
2011/0108274 A1     5/2011   Caritey et al.
2012/0210911 A1     8/2012   Tarafdar et al.

OTHER PUBLICATIONS

US Patent and Trademark Office, Office Action issued in U.S. Appl. No. 14/077,554 dated Oct. 13, 2015.
Chen, et al., "Synthesis and performance of polycarboxylic water reducing agent", abstract only.

* cited by examiner

WELLBORE CEMENT COMPOSITIONS AND WELLBORE CEMENTING METHODS

CROSS REFERENCE TO RELATED APPLICATIONS

This application is a divisional of and claims priority to U.S. patent application Ser. No. 14/077,554, filed Nov. 12, 2013, entitled "Wellbore Cement Compositions and Wellbore Cementing Methods," which is incorporated herein by reference.

TECHNICAL FIELD

Compositions and methods herein pertain to wellbore cement compositions and wellbore cementing methods, such as those that include or use an additive powder.

BACKGROUND

The process of preparing wells drilled in subterranean formations, such as hydrocarbon production wells, often includes cementing the well. Known techniques for well cementing protect and seal the wellbore. Cementing may be used to seal the annulus between the wellbore wall and casing in the wellbore. Cementing may also be used to plug portions of a well, including for the purpose of abandonment, to seal a lost circulation zone, etc.

Cement powder may be mixed with water on-site to provide cement slurry or, less preferably, mixed with water off-site and transported to the well site. Cement slurry pumped into a wellbore, such as into the annulus, displaces fluids in the wellbore and replaces them with cement. A wide variety of additives may be included in the cement slurry to provide desired time for setting the cement, density, viscosity, strength, etc. Additives may be liquid or solid. Liquid additives use additional personnel and equipment for storage, handling, and dosing into cement slurry and increase the complexity of a cementing job compared to solid additives. Unfortunately, some additives are only available in liquid form. Accordingly, additives suitable as solid replacements for known liquid additives are desirable. Solid additives may be mixed with cement powder before transport to a well site and do not use extra personnel or equipment at the site, resulting in economic savings.

SUMMARY

A wellbore cement composition includes substantially unhydrated cement powder and additive powder for cement. The additive powder is formulated from ingredients including a liquid additive for cement and solid carrier particles. The liquid additive is absorbed by the solid carrier particles.

A wellbore cementing method includes using a dry cement composition, adding water to the dry cement composition, forming a cement slurry, placing the slurry in a wellbore, and setting the placed slurry. The dry cement composition contains substantially unhydrated cement powder and retarder powder for cement. The retarder powder contains a retarder absorbed by solid carrier particles.

A wellbore cementing method includes absorbing a liquid retarder for cement using solid carrier particles and thus forming a retarder powder for cement, forming a dry cement composition, adding water to the dry cement composition, forming a cement slurry, placing the slurry in a wellbore, and setting the placed slurry. The retarder powder contains a mass of the liquid retarder at least two times a mass of the solid carrier particles. The dry cement composition contains an admixture of substantially unhydrated cement powder and the retarder powder.

DETAILED DESCRIPTION

According to one method, absorption of known liquid additives, or perhaps new liquid additives, for cement by a substrate may provide a delivery mechanism for liquid additives in a substantially dry state. As the term is used herein, "absorption" refers to the taking up of the liquid by the substrate. Absorption may occur by a variety of known physical mechanisms. Even though a liquid is absorbed by a finely divided substrate, such as powder, the substrate may nonetheless exhibit flow properties similar to those of the substrate prior to the absorption. Absorbed liquid additives may thus exhibit the properties of known solid additives that may be mixed with cement powder. For example, absorbed liquid additives may have particle size distributions similar to known solid additives. Absorbed liquid additives may be flowable to facilitate handling.

Accordingly, absorbed liquid additives may be handled as solids, reducing the amount and complexity of additive handling equipment and reducing the likelihood of error when cementing wellbores. Knowing the amount of a liquid additive absorbed by the substrate, cement powder may be prepared in advance with a desired loading of liquid additive merely by adding a corresponding amount of the substrate with absorbed liquid additive. Once liquid additive absorbs by a substrate, it may be handled in a similar manner to solid additives, such as dry powder additives. Then, the absorbed liquid additive may be mixed with other dry powder additives and cement powder without causing viscosity issues or other incompatibility issues in the cement powder. Consequently, liquid additive absorbed by a solid substrate affords the benefits of simplified handling available for dry powder additives while still allowing use of known liquid additives available in the petroleum industry.

A variety of finely-divided solid substrates might be suitable. Microporous substrates may be used, defined as substrates exhibiting pore sizes less than 2 nanometers (nm) per IUPAC notation. Absorption of the liquid additive may be accomplished at standard temperature and pressure, increased temperature and pressure, standard temperature and reduced pressure, or increased temperature and reduced pressure. Various physical and chemical properties of a liquid additive, such as viscosity and/or vapor pressure, may affect absorption. One of the listed sets of temperature and pressure operating conditions may be selected for the absorption process to produce desired characteristics for the resulting solid additive, as discussed further below. Known techniques for absorbing liquids using microporous powders may be used. Fine or course powder of various particle sizes may be selected to distribute the powder additive in cement powder, depending on desired characteristics of the powder mixture.

U.S. Pat. No. 7,086,466 issued to Roddy and U.S. Pat. No. 6,648,962 issued to Berke describe adding water to hydratable cement particulates, setting and hardening the particulates by reaction with water, comminuting the substantially hydrated mass, and providing substantially hydrated cement particulates. Additives for cement may be included in the cement particulates with the addition of water to form the hardened, substantially hydrated mass or may be coated on the resulting cement particulates. However, such a method adds the complexity of hydrating and comminuting cement particulates. The Roddy and Berke methods may be contrasted with the compositions and methods herein that rely on known solid substrates readily commercially available.

According to one composition, a wellbore cement includes substantially unhydrated cement powder and additive powder for cement. The additive powder is formulated from ingredients including a liquid additive for cement and solid carrier particles. The liquid additive is absorbed by the solid carrier particles. "Unhydrated" cement powder refers to cement powder that since its production has not been hydrated sufficiently to produce a cementitious reaction that bonds particles together. "Unhydrated" thus differs from "dehydrated," referring to the absence of water. Commercially available cement powder is generally unhydrated, but is not necessarily dehydrated since some absorption of atmospheric moisture may occur.

By way of example, the liquid additive may include a material selected from retarders, drilling mud surfactants, fluid loss agents, dispersants, antifoam agents, cement set accelerators, foamers, foam stabilizers, and combinations thereof in accordance with the known usage for such terms in the petroleum industry. Retarders increase the duration of curing for cement, such as the set time and thickening time. Since cement slurry placed in a wellbore may be exposed to elevated bore temperatures, set time may decrease at the higher temperatures. A retarder may allow control of set time at the elevated temperatures.

Drilling mud surfactants may be added in the initial volume of cement pumped into a wellbore to clean out drilling mud. A cleaning agent containing surfactant, water, weighting agent (bentonite, etc.) may be placed as a plug ahead of cement to remove incompatible components of drilling mud that may negatively impact cement quality.

Due to chemical and/or physical similarities, antifoam agents might perform similarly to retarders with regard to absorption by and release from solid carrier particles. Examples include polyglycol ether polymers, vegetable oils, silicone oils, and $C_7$ to $C_{12}$ alcohols (especially $C_8$ to $C_{10}$). Foam stabilizers may also perform similarly. Dispersants, such as polynapthalene sulfonate formaldehyde polymer, acetone formaldehyde polymers, and acrylic acid polycarboxylate polymer, may further perform similarly.

The liquid additive may include a liquid retarder for cement, discussed further below as providing unexpected benefits when absorbed by solid carrier particles and used in cement. The liquid retarder may include modified phosphonate/gluconic acid-based polymer or acrylic acid-polyethylene glycol copolymer. The solid carrier particles may include a microporous material. Solid carrier particles may also be a non-cementitious material. More specifically, solid carrier particles may include a material selected from diatomaceous earth, zeolite, aerogel, expanded ceramic, pumice, porous silica, and combinations thereof.

Depending on the properties of the liquid additive and the solid carrier particles, various liquid loadings absorbed by the solid may be provided. The additive powder may include a mass of the liquid additive at least one-half a mass of the solid carrier particles, such as at least two times a mass of the solid carrier particles. Beneficially, a loading may be selected for the liquid additive in the solid carrier particles to provide an additive powder. Then, the amount of additive powder in the cement composition may be varied to provide a desired liquid additive content in the wellbore cement composition or resulting cement slurry.

According to one method, wellbore cementing includes using a dry cement composition, adding water to the dry cement composition, forming a cement slurry, placing the slurry in a wellbore, and setting the placed slurry. The dry cement composition contains substantially unhydrated cement powder and retarder powder for cement. The retarder powder contains a retarder absorbed by solid carrier particles.

By way of example, the retarder powder may delay the set of the placed slurry longer than the slurry without the retarder powder. More specifically, the retarder powder may delay set of the cement for at least three hours following addition of the water. Unexpectedly, liquid retarder may perform better when absorbed by a substrate than when used in liquid form. For example, an amount of the retarder absorbed by the solid carrier particles may delay the set of the placed slurry longer than an equal amount of retarder in liquid form added to the cement slurry.

The method may further include dissolving the retarder from the solid particles into the cement slurry. Without being limited to any particular theory, it is possible that retarder absorbed by solid carrier particles may gradually dissolve from the carrier over a period of time. It is also possible that the process of absorbing retarder using solid carrier particles changes the physical structure of a retarder, such as a polymer, so that it becomes more effective when dissolved into cement slurry.

Retarder may release from the solid carrier particles into the cement slurry over a longer period of time than liquid retarder added to the cement slurry. The gradually dissolving and distributing retarder may contribute to the benefit of using less retarder when absorbed by solid carrier particles to provide a given set time. That is, for an amount of liquid retarder added directly to cement slurry and known for producing a certain set time, less retarder may be used when absorbed by solid carrier particles to produce the same set time. As a result, liquid additive absorption may reduce the cost of retarder usage. The cost of the retarder not needed for retarder powder may be greater than the cost of the solid carrier particles used in retarder powder.

In testing, retarder was extracted from retarder powder with water after liquid retarder absorption by solid carrier particles. The cement set time was compared for the original liquid retarder, extracted liquid retarder, and retarder powder. Although equivalent amounts of retarder were compared, extracted liquid retarder yielded about five times the set time of original liquid retarder and retarder powder yielded about ten times the set time of original liquid retarder. As a result, a beneficial physical change in the retarder apparently occurred. Thus, the distribution of retarder when absorbed by solid carrier particles may also contribute to the benefit of using less retarder to provide a given set time.

As indicated above, the solid carrier particles used in the subject method may include a microporous, non-cementitious material. Also, the solid carrier particle materials listed above for the cement composition may be used in the present method. Further, the retarder powder may exhibit the property of maintaining strength of the set cement compared to the set cement without the retarder powder. That is, the addition of solid carrier particles does not affect cured cement quality.

According to another method, wellbore cementing includes absorbing a liquid retarder for cement using solid carrier particles and thus forming a retarder powder for cement, forming a dry cement composition, adding water to the dry cement composition, forming a cement slurry, placing the slurry in a wellbore, and setting the placed slurry. The retarder powder contains a mass of the liquid retarder at least two times a mass of the solid carrier particles. The dry cement composition contains an admixture of substantially unhydrated cement powder and the retarder powder.

By way of example, an amount of the retarder absorbed by the solid carrier particles may delay the set of the placed slurry longer than an equal amount of retarder in liquid form added to the cement slurry. The liquid retarder may include modified phosphonate/gluconic acid-based polymer or acrylic acid-polyethylene glycol copolymer. The solid carrier particles may include microporous, non-cementitious material.

EXAMPLE 1

Liquid retarders R-450L and SR-34L were absorbed by diatomaceous earth in amounts that nevertheless maintained a free-flowing solid product. Both R-450L and SR-34L are modified phosphonate/gluconic acid-based polymers available from Nalco Co. in Naperville, Ill. The absorption was done by warming the fluids and adding them to the diatomaceous earth under vacuum. Using this method, loadings of 1.69 grams (g) of R-450L per 1.0 g of diatomaceous earth and 2.24 g of SR-34L per 1.0 g of diatomaceous earth were achieved as the absorbable limits.

EXAMPLE 2

Comparison of thickening times for liquid retarder (R-450L) and absorbed liquid retarder (R-450L-SORB) under the same conditions of temperature and pressure, density, and slurry design are shown in Table 1, Table 2, and Table 3. The amount of retarder absorbed by the diatomaceous earth (DE) in grams per sack (gps) was equal to be the amount of the liquid retarder used in the slurry.

Data in Table 1 was collected from a slurry at 258° F. containing 15.80 pounds per thousand gallons (ppg) Dykerhoff G cement and 35% by weight of cement (BWOC) silica flour. The R-450L-SORB contained 1.69 g R-450L per 1.0 g DE). Measurements were taken using a known consistometer in which "Bc" refers to Bearden Units of Consistency, giving an indication of pumpability. "Shear Pin" refers to the breaking of a shear pin when the cement sets, avoiding damage to the consistometer. To reduce settling, ASA-301 free fluid control agent available from Fritz Industries, Inc. in Mesquite, Tex. was included in samples that showed solid components in the cement slurry beginning to settle out.

TABLE 1

| Retarder | Retarder % BWOC | Equivalent gps Retarder | 70 Bc hr:mn | 100 Bc hr:mn | Shear Pin hr:mn |
|---|---|---|---|---|---|
| R-450L-SORB | 0.25 | 0.017 | 0:54 | 0:59 | 1:18 |
| R-450L-SORB | 1 | 0.066 | 1:45 | 1:46 | 2:16 |
| R-450L-SORB | 1.25 | 0.83 | 1:55 | 1:57 | 2:31 |
| R-450L-SORB | 2 | 0.132 | 3:36 | 3:37 | 3:48 |
| none | 0 | 0 | 1:01 | 1:04 | 1:17 |
| No retarder, 1% DE | 0 | 0 | 0:41 | 0:51 | 1:07 |
| R-450L* | 1 | 0.066 | 1:27 | 1:28 | 1:30 |
| R-450L* | 2 | 0.132 | 1:50 | 1:51 | 1:51 |

(*contained 0.15% BWOC (by weight of cement) ASA-301)

Data in Table 2 was collected from a slurry at 291° F. containing 15.80 ppg Dykerhoff G cement and 35% BWOC silica flour. The R-450L-SORB contained 1.69 g R-450L per 1.0 g DE)

TABLE 2

| Retarder | Retarder % BWOC | Equivalent gps Retarder | 70 Bc hr:mn | 100 Bc hr:mn | Shear Pin hr:mn |
|---|---|---|---|---|---|
| R-450L-SORB | 2 | 0.132 | 1:30 | 1:37 | 1:48 |
| R-450L-SORB | 4 | 0.26 | 2:03 | 2:04 | 2:10 |
| R-450L | 2 | 0.132 | 1:26 | 1:27 | 1:30 |
| R-450L | 4 | 0.26 | 1:46 | 1:47 | 1:49 |

Data in Table 3 was collected from a slurry at 258° F. containing 15.80 ppg Dykerhoff G cement and 35% BWOC silica flour. The SR-34L-SORB contained 2.24 g SR-34L per 1.0 g DE.

TABLE 3

| Retarder | Retarder % BWOC | Equivalent gps Retarder | 70 Bc hr:mn | 100 Bc hr:mn | Shear Pin hr:mn |
|---|---|---|---|---|---|
| SR-34L-SORB* | 2 | 0.132 | 28:54 | 28:54 | 29:10 |
| SR-34L* | 2 | 0.132 | 3:16 | 3:18 | 3:25 |
| SR-34L + DE* | 2 | 0.132 | 2:51 | 2:54 | 3:40 |

(*contained 0.15% BWOC ASA-301)

Absorption of R-450L by diatomaceous earth increased its retardation ability approximately 20 minutes beyond the equivalent amount of unabsorbed R-450L at 291° F. At 258° F., 1% of the retarder showed a twenty minute difference between the absorbed and unabsorbed R-450L. Increasing the concentration to 2% resulted in more than doubling the retardation time of the absorbed R-450L.

Without being limited to any particular theory, it is believed that the release of R-450L from the diatomaceous earth was not instantaneous, but followed a short amount of time which then delayed its effect. However, the theory was not tested.

Absorption of SR-34L by diatomaceous earth resulted in a material which gave an extreme lengthening of retardation time compared to the equal amount of liquid SR-34L. It was not determined why such an increase occurred. One theory was that the process to absorb the SR-34L resulted in breaking the polymer chain into smaller pieces. It was reported elsewhere that such lower molecular weight materials are stronger retarders than higher molecular weight polymers. No synergy was observed in extending retardation when liquid SR-34L and plain diatomaceous earth were combined separately in the cement.

EXAMPLE 3

Using the same process as Example 1, S-5 liquid spacer surfactant package available from Baker Hughes, Inc. in Houston, Tex. was absorbed by diatomaceous earth with a loading of 0.84 g of S-5 per 1.0 g diatomaceous earth as the absorbable limit.

EXAMPLE 4

A 15.5 ppg oil-based synthetic mud was obtained from the Newfield Morro Creek H&P 389 site, lot #16150P130261. A 17.5 ppg spacer system was created containing ASA-301, Barite (barium sulfate weighting additive), FP-6L defoamer available from Geo Specialty Chemicals in Ambler, Pa., water, and the S-5 surfactant (either liquid or absorbed). Various amounts of each component were evaluated at 160° F. in a compatibility mud test performed for different rates of pure liquid S-5 and absorbed S-5 surfactant in a spacer system. Rheologies were measured for 100% mud, 75% mud-25% spacer, 50% mud-50% spacer, 25% mud-75% spacer, and 100% spacer. Incompatibilities were detected when rheologies between 100% oil based mud and 100% spacer fluid exceeded the viscosity of the pure fluids.

In each test using the absorbed S-5, viscosities significantly higher than pure mud and pure spacer were observed. The high viscosity indicated the S-5 was not available to help homogenize the mud/spacer system, but instead the system formed viscose emulsion-type fluids. The presence of the emulsion-type fluids suggested S-5 might have remained trapped in the diatomaceous earth for an undetermined reason.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A wellbore cementing method comprising:
   using a dry cement composition containing:
     a substantially unhydrated cement powder; and
     a non-cementitious, free-flowing retarder powder for cement, the retarder powder containing a liquid retarder absorbed by non-cementitious, free-flowing, solid carrier particles;
   adding water to the dry cement composition and forming a cement slurry; and
   placing the slurry in a wellbore and setting the placed slurry.

2. The method of claim 1 wherein the retarder powder delays the set of the placed slurry longer than the slurry without the retarder powder.

3. The method of claim 1 wherein the retarder powder delays set of the cement for at least three hours following addition of the water.

4. The method of claim 1 wherein an amount of the retarder absorbed by the solid carrier particles delays the set of the placed slurry longer than an equal amount of retarder in liquid form added to the cement slurry.

5. The method of claim 1 wherein the solid carrier particles comprise a microporous material.

6. The method of claim 1 wherein the solid carrier particles comprise a material selected from the group consisting of diatomaceous earth, zeolite, aerogel, expanded ceramic, pumice, porous silica, and combinations thereof.

7. The method of claim 1 further comprising dissolving the retarder from the solid carrier particles into the cement slurry.

8. The method of claim 1 wherein the retarder powder exhibits the property of maintaining strength of the set cement compared to the set cement without the retarder powder.

9. A wellbore cementing method comprising:
   absorbing a liquid retarder for cement using non-cementitious, free-flowing, solid carrier particles and thus forming a non-cementitious retarder powder for cement as a free-flowing solid, the retarder powder containing a mass of the liquid retarder at least two times a mass of the solid carrier particles;
   forming a dry cement composition at a location off-site from a well site, the dry cement composition containing an admixture of:
     a substantially unhydrated cement powder; and
     the non-cementitious, free-flowing retarder powder;
   transporting the dry cement composition containing the absorbed liquid retarder from the off-site location to the well site;
   adding water to the dry cement composition at the well site and forming a cement slurry; and
   placing the slurry in a wellbore at the well site and setting the placed slurry.

10. The method of claim 9 wherein an amount of the retarder absorbed by the solid carrier particles delays the set of the placed slurry longer than an equal amount of retarder in liquid form added to the cement slurry.

11. The method of claim 9 wherein the liquid retarder comprises modified phosphonate/gluconic acid-based polymer or acrylic acid-polyethylene glycol copolymer.

12. The method of claim 9 wherein the solid carrier particles comprise a microporous material.

13. A wellbore cementing method comprising:
   absorbing a liquid additive for cement using non-cementitious, free-flowing, solid carrier particles and thus forming a non-cementitious additive powder for cement as a free-flowing solid, the additive powder containing a mass of the liquid additive at least two times a mass of the solid carrier particles;
   forming a dry cement composition containing an admixture of:
     substantially unhydrated cement powder; and
     the non-cementitious, free-flowing additive powder, which is distributed in the cement powder;
   after distributing the additive powder in the cement powder, adding water to the dry cement composition and forming a cement slurry; and
   placing the slurry in an annulus between a wellbore and a casing in the wellbore and setting the placed slurry.

14. The method of claim 13 wherein the solid carrier particles comprise a microporous material and the liquid additive comprises a material selected from the group consisting of retarders, drilling mud surfactants, fluid loss agents, dispersants, antifoam agents, cement set accelerators, foamers, foam stabilizers, and combinations thereof.

15. The method of claim 14 wherein the liquid additive comprises a material selected from the group consisting of retarders including modified phosphonate/gluconic acid-based polymer or acrylic acid-polyethylene glycol copolymer, dispersants including polynapthalene sulfonate formaldehyde polymer, acetone formaldehyde polymers, or acrylic acid polycarboxylate polymer, antifoam agents including polyglycol ether polymers, vegetable oils, silicone oils, or $C_7$ to $C_{12}$ alcohols, and combinations thereof.

16. The method of claim 13 wherein the liquid additive is a liquid retarder for cement.

17. The method of claim 16 wherein an amount of the retarder absorbed by the solid carrier particles delays the set of the placed slurry longer than an equal amount of retarder in liquid form added to the cement slurry.

18. The method of claim 13 wherein the solid carrier particles comprise diatomaceous earth.

19. The method of claim 13 wherein forming the dry cement composition occurs at a location off-site from a well site and the method further comprises transporting the dry cement composition containing the absorbed liquid additive from the off-site location to the well site.

20. The method of claim 13 wherein adding the water to the dry cement composition occurs at a well site and the wellbore is at the well site.

21. The method of claim 1 wherein adding the water to the dry cement composition occurs at a well site and the wellbore is at the well site.

\* \* \* \* \*